(12) United States Patent
Joshi et al.

(10) Patent No.: US 10,688,418 B2
(45) Date of Patent: Jun. 23, 2020

(54) CLEANING APPARATUS FOR CLEANING FILTER SCREENS

(71) Applicant: Jain Irrigation Systems Limited, Jalgaon, Maharashtra (IN)

(72) Inventors: Abhijit Bhaskar Joshi, Jalgaon (IN); Ajit Bhavarlal Jain, Jalgaon (IN)

(73) Assignee: Jain Irrigation Systems Limited, Jalgaon (IN)

( * ) Notice: Subject to any disclaimer, the term of this patent is extended or adjusted under 35 U.S.C. 154(b) by 242 days.

(21) Appl. No.: 15/536,740

(22) PCT Filed: Jan. 4, 2016

(86) PCT No.: PCT/IN2016/000003
§ 371 (c)(1),
(2) Date: Jun. 16, 2017

(87) PCT Pub. No.: WO2016/108253
PCT Pub. Date: Jul. 7, 2016

(65) Prior Publication Data
US 2019/0091612 A1     Mar. 28, 2019

(30) Foreign Application Priority Data
Jan. 4, 2016 (IN) .......................... 2174/MUM/2014

(51) Int. Cl.
*B01D 29/00* (2006.01)
*B01D 29/64* (2006.01)
(Continued)

(52) U.S. Cl.
CPC ......... *B01D 29/6438* (2013.01); *B01D 29/00* (2013.01); *B01D 29/114* (2013.01);
(Continued)

(58) Field of Classification Search
None
See application file for complete search history.

(56) References Cited

U.S. PATENT DOCUMENTS

| 523,581 A | 7/1894 | Klinger |
| 5,228,993 A | 7/1993 | Dori |
| (Continued) | | |

FOREIGN PATENT DOCUMENTS

| CN | 103611343 B | 7/2015 |
| WO | 2012073247 A1 | 6/2012 |

OTHER PUBLICATIONS

CN103611343A Li et al.—Backwash spray nozzle for granular filter material filter device (Abstract $ MT; Mar. 5, 2005; 12 pages). (Year: 2014).*

*Primary Examiner* — Hayden Brewster
(74) *Attorney, Agent, or Firm* — Pepper Hamilton LLP

(57) ABSTRACT

There is disclosed an apparatus for cleaning circular filter screens comprising at least one suction chamber fitted to a conduit of the dirt collection conduit system extending along a central axis of the housing of the filter screen. The suction chamber comprises a central nozzle through which fluid is forced to flow by virtue of a pressure differential between the outer surface of the filter screen and an extremity of the dirt collection conduit system. The fluid flow through the central nozzle creates a low pressure regime near the mouth of the central nozzle such that fluid is forced through a plurality of peripheral suction nozzles arranged around the central nozzle from the outer surface of the filter screen to the inside of the suction chamber, thereby forcing the dirt and retentate accumulated along the inner surface of the filter screen to be washed away.

10 Claims, 10 Drawing Sheets

(51) Int. Cl.
*B01D 29/68* (2006.01)
*B01D 29/11* (2006.01)
C02F 1/00 (2006.01)
*B01D 29/01* (2006.01)

(52) U.S. Cl.
CPC .............. *B01D 29/68* (2013.01); *B01D 29/01* (2013.01); *C02F 2303/24* (2013.01)

(56) References Cited

U.S. PATENT DOCUMENTS

| | | |
|---|---|---|
| 5,268,006 A | 12/1993 | Bazuza |
| 5,322,222 A | 6/1994 | Lott |
| 6,634,372 B2 | 10/2003 | Bergmann |
| 7,559,982 B2 | 7/2009 | Arai |

\* cited by examiner

CLEANING APPARATUS FOR CLEANING FILTER SCREENS

This application is a national phase filing under 35 U.S.C. § 371 of International Patent Application No. PCT/IN2016/000003, filed Jan. 4, 2016, which claims the benefit of Indian Patent Application No. 2174/MUM/2014, filed Jan. 4, 2015, each of which is incorporated herein by reference in its entirety.

TECHNICAL FIELD OF THE INVENTION

This invention generally relates to a cleaning apparatus for cleaning filter screens and specifically to cleaning apparatus for cleaning filter screens having nozzles for creating suction. This invention finds particular, but not exclusive, application in industries employing filter screens for filtering purposes.

BACKGROUND OF THE INVENTION

Many hydraulic equipments involve the use of filter screens for filtering water that is used in the hydraulic equipments. The water that is used can be contaminated, so that the contaminants are retained at the filters and the accumulation of the contaminants results in the formation of retentate. Retentate slows down the flow of water and increases the differential pressure. Dust extraction assemblies for removing contamination are constructed of a plurality of nozzles at pre-defined distances from the surface of filter element. Such nozzles are connected to collector pipe which moves with the help of hydraulics or electric motors. A purge valve is connected to the dust collector pipe which opens to the atmosphere. Cleaning of the filter screen is done automatically either on the basis of differential pressure between filter housing and pressure at the purge valve outlet (atmospheric pressure) or it can be done according to preset time interval. During the cleaning process, the purge valve opens and fluid enters into the plurality of nozzles which are in close proximity to the filter screen. Depending on differential pressure, debris/retentate deposited on the element surface is pulled out through nozzles and finally discharged from filter housing through the flushing line. The disadvantage with the above described self-cleaning mechanism is the reduction of the cleaning efficiency and effectiveness.

OBJECTIVES OF THE INVENTION

1. It is the primary objective of the invention to provide an apparatus for efficient cleaning of filters with increased suction force
2. It is another objective of the invention to provide an apparatus for utilizing a low volume of liquid for cleaning as cleaning can be performed at low pressure

SUMMARY OF THE INVENTION

According to an aspect of an invention, a cleaning apparatus for cleaning filter screen is disclosed, comprising a suction chamber movably positioned adjacent a filter screen to be cleaned such that a first end of the suction chamber is positioned adjacent an inner surface of the filter screen and a second end of the suction chamber being coupled to a dirt collection conduit system for fluid communication with the dirt collection system. The outer surface of the filter screen is arranged to be at a higher pressure than the dirt collection conduit system such that a pressure differential is arranged to be maintained between the outer surface of the filter screen and the dirt collection conduit system through the suction chamber. The suction chamber further comprises a nozzle at the first end, wherein a largest diameter of the nozzle is lesser than an inner diameter of the suction chamber, the nozzle and the suction chamber arranged concentrically. The suction chamber further comprises a circular clearance between the largest diameter of the nozzle and the inner diameter of the suction chamber. The pressure differential is arranged to facilitate movement of fluid from the outer surface of the filter screen to the dirt collection conduit system and wherein the fluid movement through the nozzle of the suction chamber creates a low pressure regime around a mouth of the nozzle inside the suction chamber, thereby facilitating fluid from the outer surface of the filter screen to rush towards the low pressure regime through the circular clearance, thus removing retentate forcefully from the inner surface of the filter screen.

DETAILED DESCRIPTION

Figure 1:
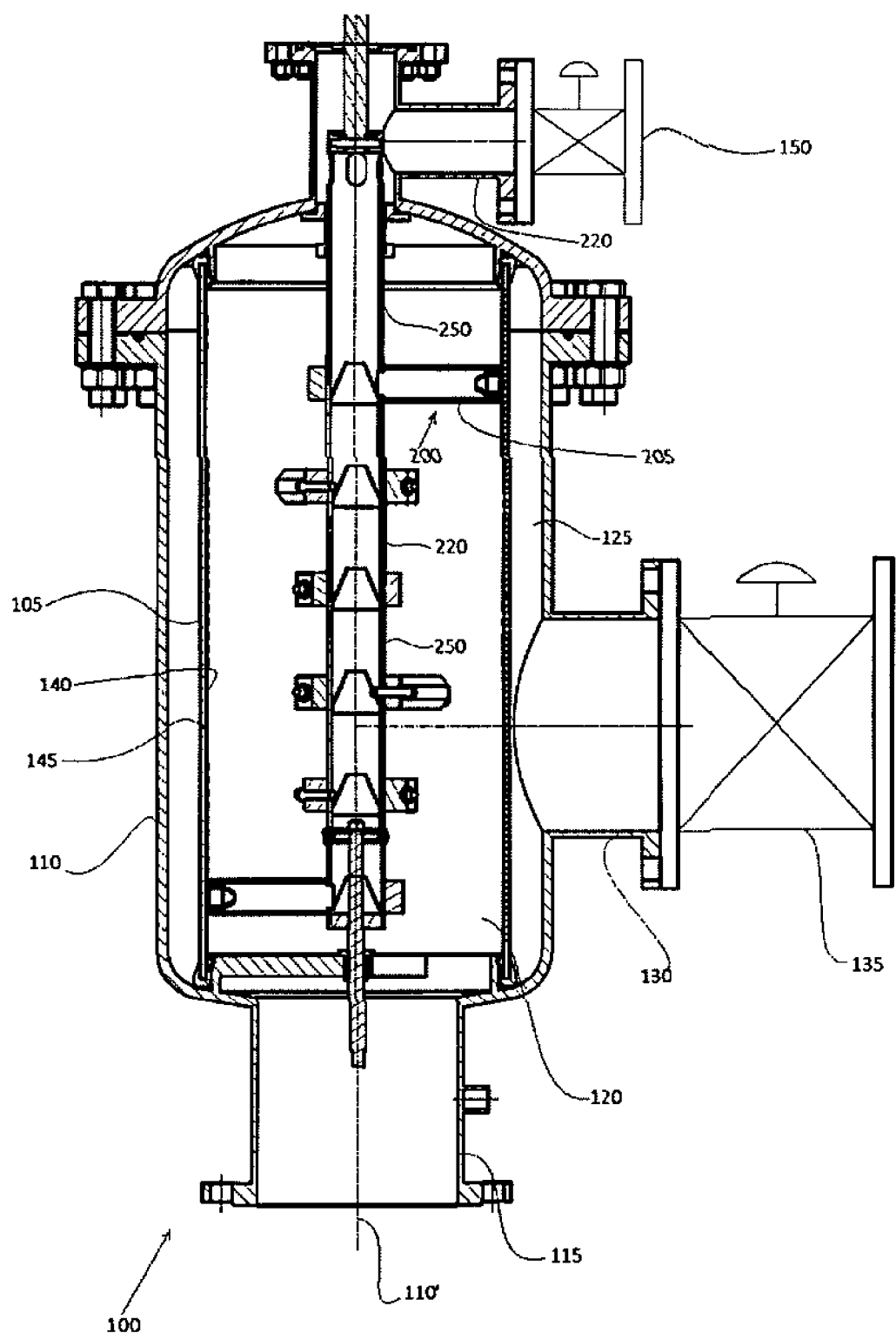
FIG. 1 shows a screen filtering system with a cleaning apparatus for cleaning the filter screen in the screen filtering system

FIG. 1 shows a screen filtering system 100 with a cleaning apparatus 200 for cleaning the filter screen 105 in the screen filtering system 100. The screen filtering system 100 comprises a housing 110 which is circular in profile. The screen filter 105 is fitted by way of suitable fastening arrangements to the housing 110 internally, the fastening arrangements being water proof. For the purposes of visualization, the housing 110 and the filter screen 105 are concentric cylinders with the filter screen 105 arranged internally to the housing 110. The screen filtering system 100 further comprises an inlet pipe 115 which opens into a chamber 120 internal to the filter screen 105. The water that is pressurized passes through the filter screen 105 into tire circular clearance or interval 125 between the filter screen 105 and the housing 110 and exist through an exit pipe 130 which is controlled by a valve 135. In the process of water or any Other fluid flowing in this way, the contaminants in the fluid get accumulated on an inner surface 140 of the filter screen 105. The accumulated contaminants form as retentate on the inner or internal surface 140 of the filter screen 105.

Figure 2:
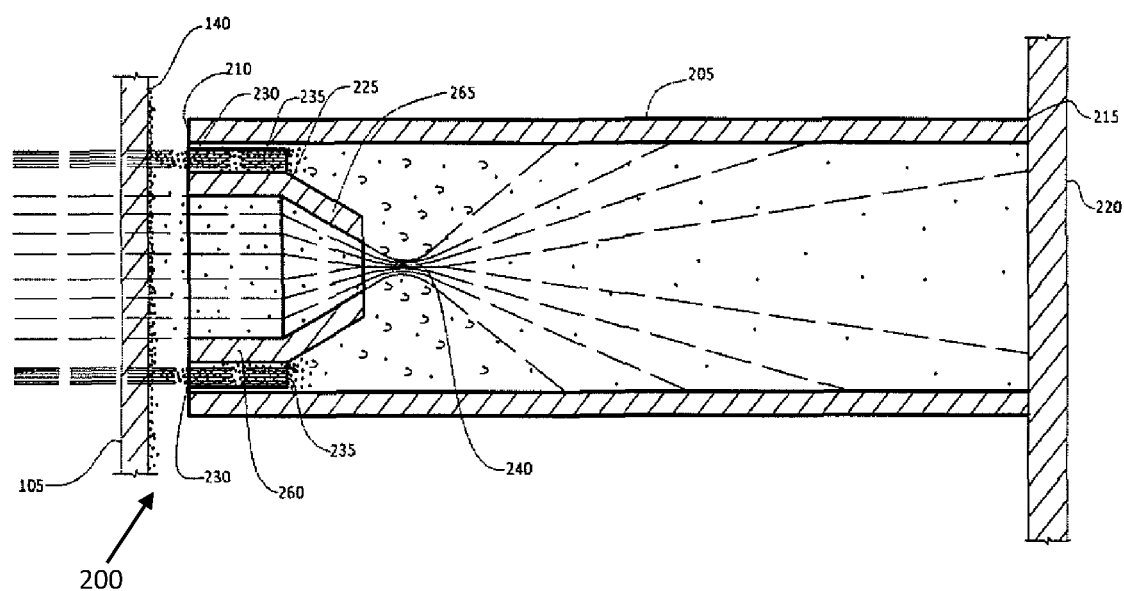
FIG. 2 shows a first embodiment of the cleaning apparatus

FIG. 2 shows a first embodiment of the cleaning apparatus 200. The cleaning apparatus 200 comprises a suction chamber 205, which is a cylindrical element of constant diameter that is movably positioned adjacent the filter screen 105 to be cleaned. The suction chamber 205 is positioned in such a way that it is orthogonal to the filter screen 105. The suction chamber 205 comprises a first end 210 adjacent the inner surface 140 of the filter screen 105 and a second end 215 of the suction chamber 205 coupled to a dirt collection conduit system 220. The dirt collection conduit system 220 extends along an axis 110' of the housing 110. The suction chamber 205 extends from the dirt collection conduit system 220 to the inner surface 140 of the filter screen. The suction chamber 205 is orthogonal to the axis 110' as well. The suction chamber 205 is coupled to the dirt collection conduit system 220 such that there is fluid communication between the suction chamber 205 and the dirt collection conduit system 220. The filter screen comprises an outer or external surface 145 which is arranged to be at atmospheric pressure or a pressure higher than that when the cleaning apparatus 200 is being used. The dirt collection conduit system 220 extends along the axis 110' of the housing 110 and opens out externally through a purge outlet 150 and a purging valve 155. The purge outlet 150 is connected to a low pressure environment when the cleaning apparatus 200 is being used. Thus, when the cleaning apparatus 200 is being used, there is maintained a pressure differential between the outer surface or external surface 145 and the dirt collection conduit system 220.

The suction chamber 205 further comprises a central nozzle 225 attached to the first end 210 of the suction chamber 205. The central nozzle 225 is such that a largest diameter of the central nozzle 225 is lesser than an inner diameter of the suction chamber 205. The central nozzle 225 and the suction chamber 205 are arranged concentrically. Between the largest diameter of the central nozzle 225 and the inner diameter of the suction chamber 205 is a circular clearance 230 in which is circularly arranged a plurality of peripheral suction nozzles 235. The cleaning apparatus 200 is activated by initiating and maintaining a pressure differential between the outer surface 145 of the filter screen 105 and the dirt collection conduit system 220. This pressure differential causes movement of fluid from the outer surface 145 of the filter screen 105 to the dirt collection conduit system 220 through the suction chamber 205. When the fluid moves through the central nozzle 225 of the suction chamber 205, a low pressure regime 240 is created around and in proximity to a mouth 245 of the central nozzle 225 inside the suction chamber 205. This low pressure regime 240 acts as a suction force to suck or pull fluid from the outer surface 145 of the filter screen 105 to rush towards the low pressure regime 240, such that the retentate accumulated in the inner surface 140 of the filter screen 105 is forcefully removed. The low pressure regime is formed due to increased velocity which is due to the convergence in the section of the nozzle 225. The pressure differential due to the low pressure regime 240 created is more than the pressure differential between the outer surface 145 of the filter screen 105 and the purge outlet 150 through the dirt collection conduit system 220.

As illustrated in FIG. 1, the suction chamber 205 is arranged to rotate about an axis 110' of the dirt collection conduit system 220. The axis 110' of the dirt collection conduit system 220 is the same as the axis 110' of the housing 110, as the dirt collection conduit system 220 extends along the axis 110' of the housing 110. The rotation of the suction chamber 205 is meant to remove the retentate from a circular portion of the cylindrical filter screen 105. Hence, one complete rotation of the suction chamber 205 about the axis 110' of the dirt collection conduit system 220 when the cleaning apparatus 200 is functioning, results in the removal of retentate circularly from the filter screen 105.

The cleaning apparatus 200 further comprises a plurality of suction chambers 205 coupled rotatably to the dirt collection conduit system 220 at different positions along the axis 110' of the dirt collection conduit system 220. The number of rotatable suction chambers 205 can vary anywhere from 2 to 5 or more depending on the length of the filter screen 105 inside the housing 110, The advantage of having a plurality of suction chambers 205 is to cover the entire surface area of the filter screen 105. The rotation of the suction chambers 205 is achieved by hydraulic or electric rotating techniques, which is understood by a person skilled in the art. The principle of working of the plurality of suction chambers 205 are the same as described above.

The dirt collection conduit system 220 further comprises a plurality of nozzles 250 arranged inside a conduit 255 of the dirt collection conduit system 220, such that the number of nozzles 250 is the same as the number of suction chambers 205. One nozzle among the plurality of nozzles 250 is associated with one suction chamber within the plurality of suction chambers 205. Each nozzle among the plurality of nozzles 250 creates a low pressure regime near the mouth of the nozzle which enhances or adds up the suction force inside the suction chambers 205 triggered by the existence of the pressure differential between the outer surface 145 of the filter screen 105 and the dirt collection conduit system 220. This is described in detail hereinafter.

Figure 3:
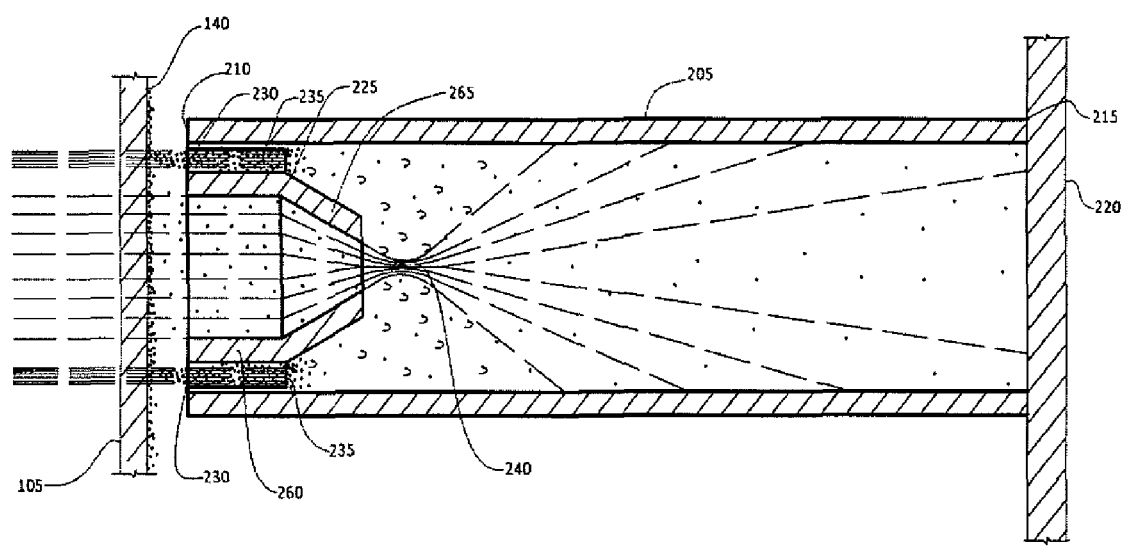
FIG. 3 shows a divergent nozzle disposed in the suction chamber of the first embodiment of the cleaning apparatus

As illustrated in FIG. 2, the central nozzle 225 comprises a first portion 260 with a constant cross sectional area and a second portion 265 with a converging cross sectional area. The first portion 260 is proximal and adjacent to the first end 210 of the suction chamber 205 and the second portion 265 is distal to the first end 210 of the suction chamber 205. FIG. 3 shows a divergent cone 270 disposed in the suction chamber 205 of the first embodiment of the cleaning apparatus 200. The suction chamber 205 can additionally comprise a divergent cone 270 extending from an opening or mouth of the second portion 265 to the second end 215 of the suction chamber 205 leaving a gap around 265. Divergent cone 270 facilitates streamlining of fluid ejected from the second portion 265 of the nozzle 225. In the presence of the divergent nozzle 270, the low pressure regime 240 is generated inside the divergent nozzle 270 near the mouth of the second portion 265. The angle of the second portion 265 is α and the angle of the divergent cone 270 is β. The optimum values for α and β can be 30° to 50° and 1° to 10° respectively.

Figure 4:
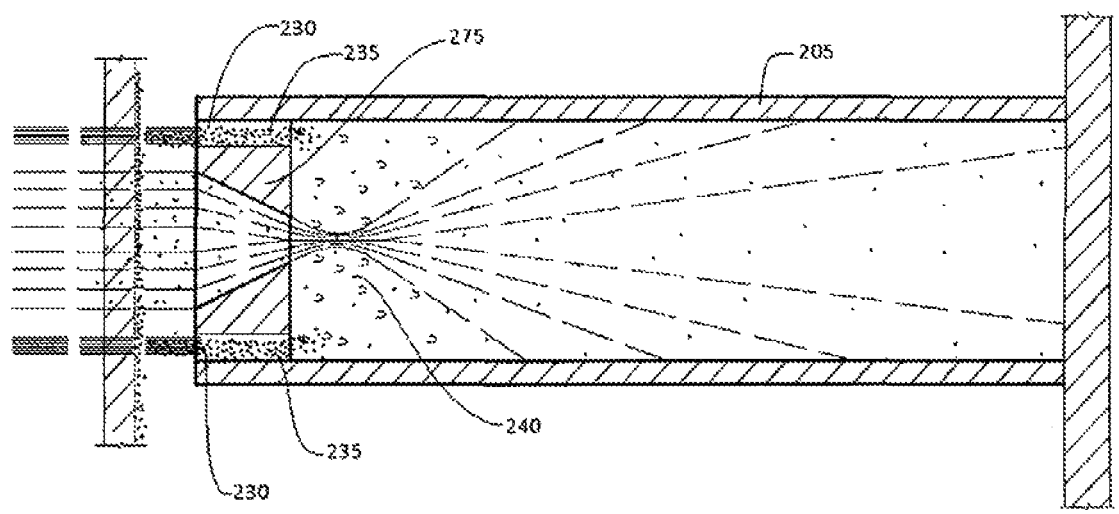
FIG. 4 shows a second embodiment of the cleaning apparatus
Figure 5A:
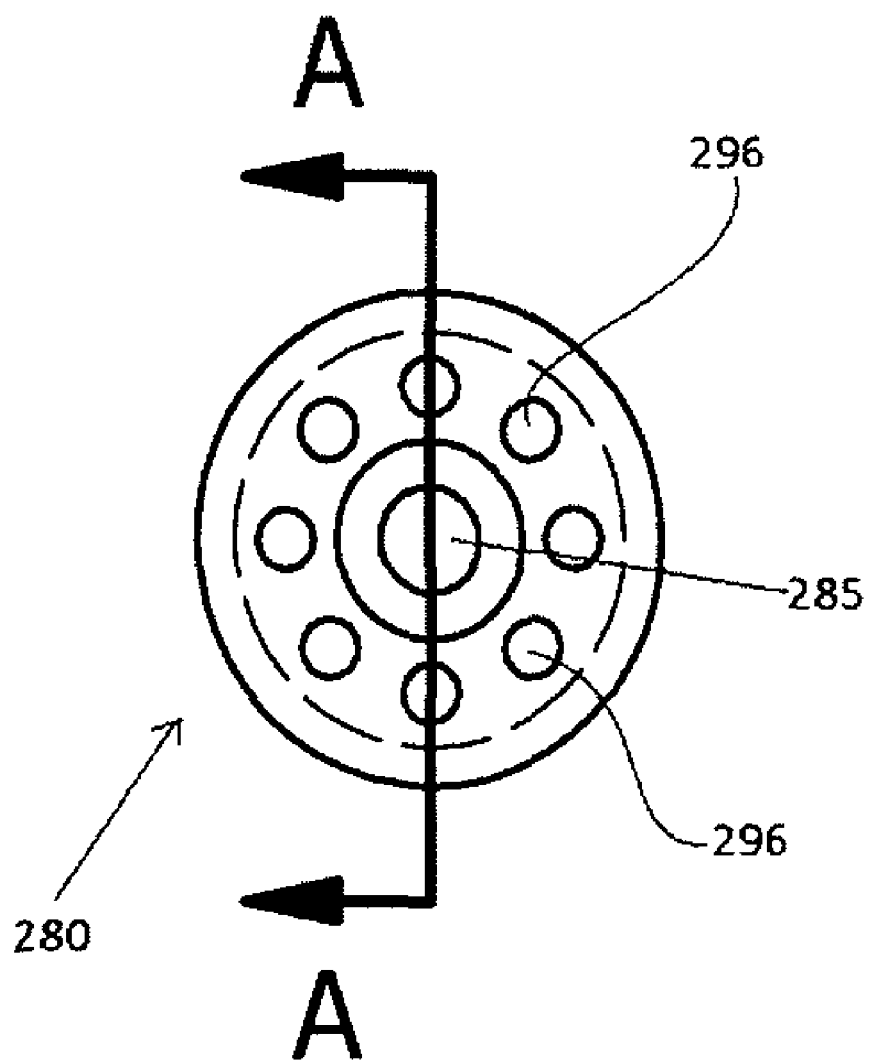
FIG. 5a shows a front elevational view of an orifice plate
Figure 5B:
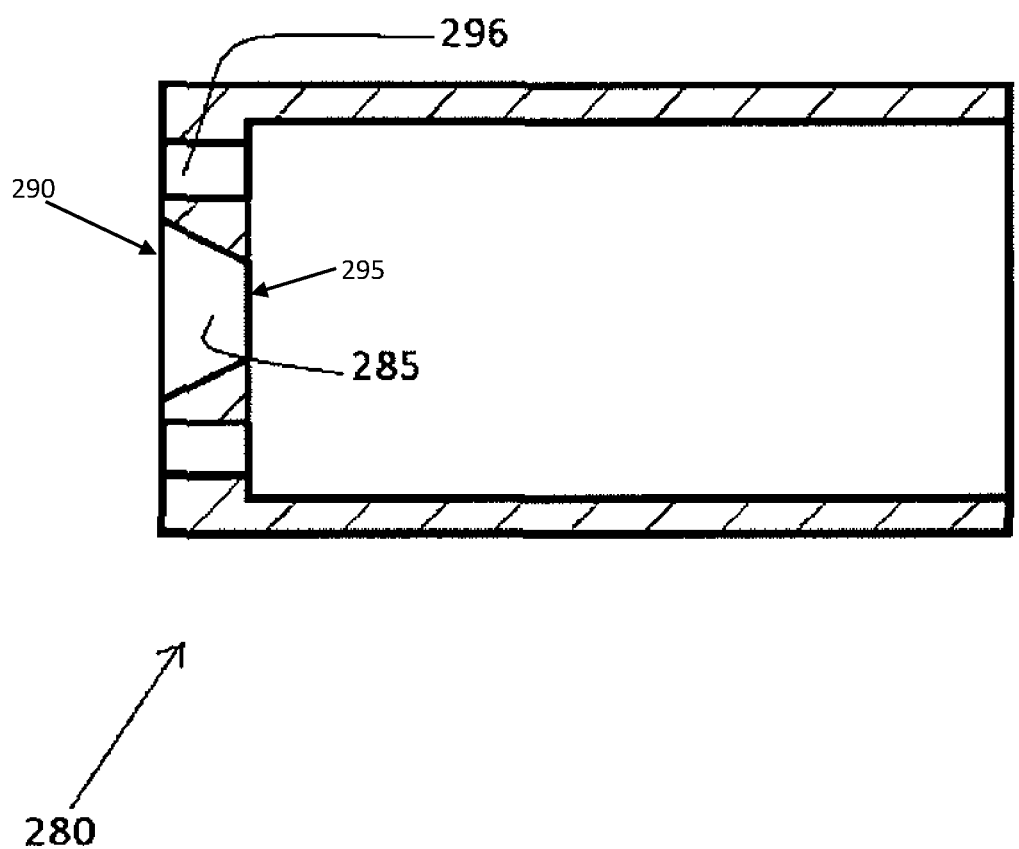
FIG. 5b shows a longitudinal sectional view along section A-A of the orifice plate shown in FIG. 5a FIG. 6 shows a first arrangement of a nozzle in the conduit of the dirt collection conduit system

FIG. 4 shows a second embodiment of the cleaning apparatus 200. In this embodiment, the central nozzle 225 comprises a converging portion 275. The second embodiment of the cleaning apparatus 200 is easy to manufacture resulting in lesser cost of manufacture. Near the mouth of the central nozzle 225 is created the low pressure regime 240. There is a circular clearance 230 as described above between the central nozzle 225 and the suction chamber 205. The central nozzle 225 and the suction chamber 205 are arranged coaxially. The circular clearance 230 comprises a plurality of peripheral suction nozzles 235 arranged circularly in the circular clearance 230. The low pressure regime 240 enables fluid to be sucked in forcefully through the plurality of suction nozzles 235, so as to remove the retentate from the inner surface 140 of the filter screen 105. The central nozzle 225 and the nozzles 250 of the dirt collection conduit system work on the principle of venturi in producing a low pressure regime and associated suction. The central nozzle 225 in all the embodiments mentioned can be circular, elliptical, rectangular or any other polygonal shape. The second embodiment as mentioned above can be achieved with the help of an orifice plate as illustrated in FIGS. 5a and 5b. FIG. 5a shows a front elevational view of an orifice plate 280. FIG. 5b shows a longitudinal sectional view along section A-A of the orifice plate 280 shown in FIG. 5a. The construction or structural arrangement of the second embodiment is mentioned below. The suction chamber 205 is fitted with the orifice plate 280 at the first end 210 such that the orifice plate 280 fits over the central nozzle 225. The orifice plate 280 has a bore 285 which fits over the central nozzle 225 of the suction chamber 205. The bore 285 comprises a principal circular bore 290 and a secondary circular bore 295. The principal circular bore 290 and the secondary circular bore 295 are coaxial and matches with the dimensions of the central nozzle 225 to provide a good fit for the orifice plate 280 over the central nozzle 225. The orifice plate comprises a plurality of holes 296 in the periphery and surrounding the bore 285 to form the plurality of peripheral suction nozzles 235.

The external surface of the suction chamber 205 can be circular, elliptical or any polygonal shape. The internal surface and cavity of the suction chamber 205 is cylindrical. For an externally elliptically shaped suction chamber 205, it is arranged in five housing 100 in such a way that the major axis makes an angle θ with a horizontal plane. The suction chamber 205 is arranged such that the slope of travel path of the suction chamber 205 matches θ. The advantage of this arrangement is to minimize the drag force acting on the suction chamber 205 and make the cleaning apparatus 200 more efficient.

Figure 6:
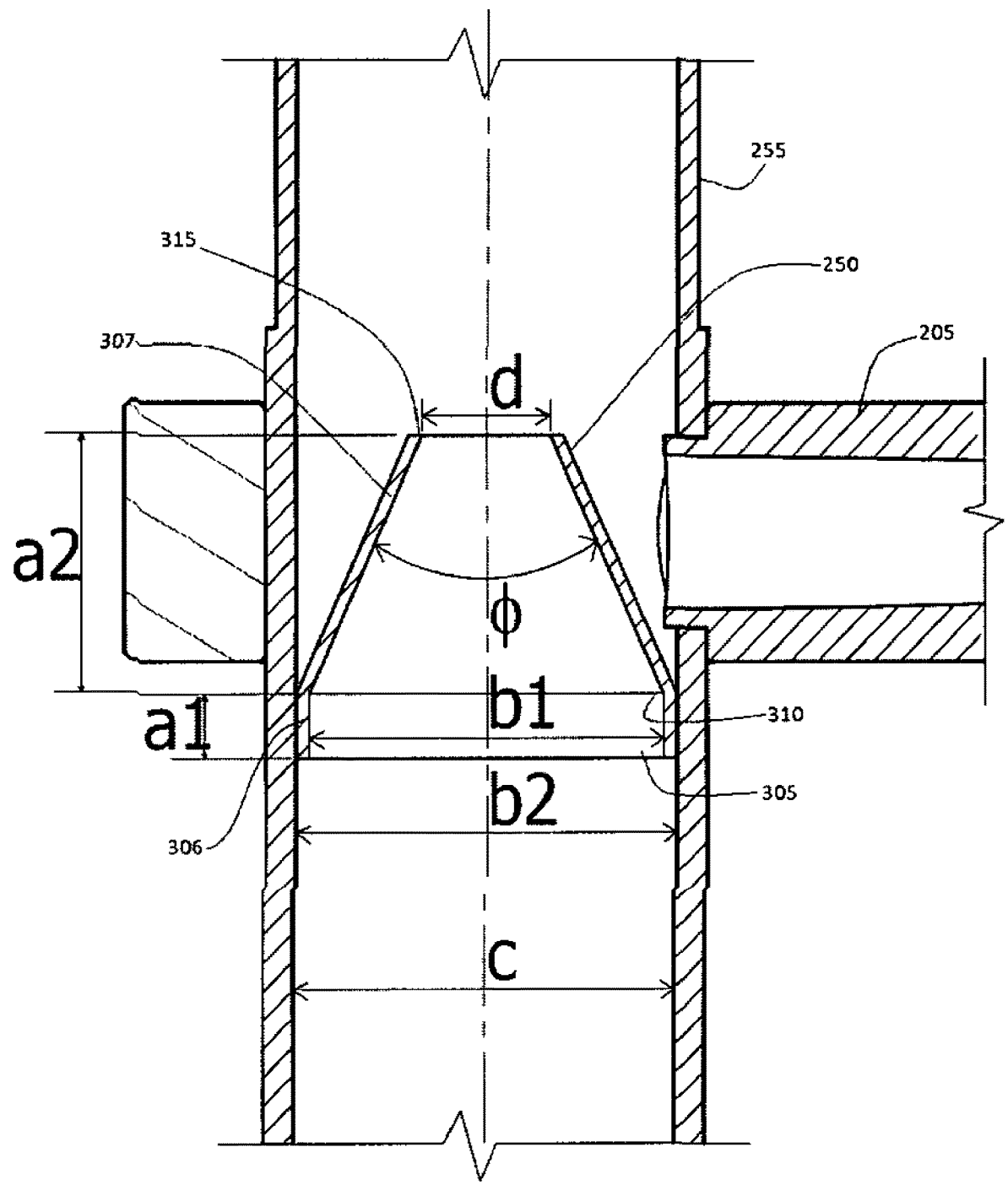

FIG. 6 shows one of the plurality of nozzles 250 disposed in the conduit 255 of the dirt collection conduit system 220 as a first arrangement for producing a low pressure regime in the conduit 255 of the dirt collection conduit system 220. As illustrated in FIG. 6, the nozzle 250 is arranged inside the conduit 255 of the dirt collection conduit system 220. The nozzle 250 is disposed in the conduit 255 such that it is adjacent to where the suction chamber 205 opens into the conduit 255, such that the low pressure regime created near the mouth of the nozzle 250 serves to enhance the suction inside the suction chamber 205. The nozzle 250 comprises concentrically placed boreholes 305, 310 and 315. Outer diameter b2 of the nozzle 250 fits inside the inner diameter c of the conduit 255. The distance between the boreholes 305 and 310 is a1 and this forms a first portion 306 of the nozzle 250 with a constant diameter. The length of the nozzle 250 between the boreholes 310 and 315 is converged such that the diameter of the borehole 315 is lesser than the diameter of the borehole 305 and 310. This converging portion forms a second portion 307 of the nozzle 250. The angle of convergence is Φ. The angle of convergence Φ can be any angle between 30° and 50°. The distance between the boreholes 310 and 315 is a2. The inner diameter of the nozzle 250 at the borehole 310 is b1 and the inner diameter of the nozzle 250 at the borehole 315 is d. The mouth of the nozzle 250 is at the borehole 315.

Figure 7:
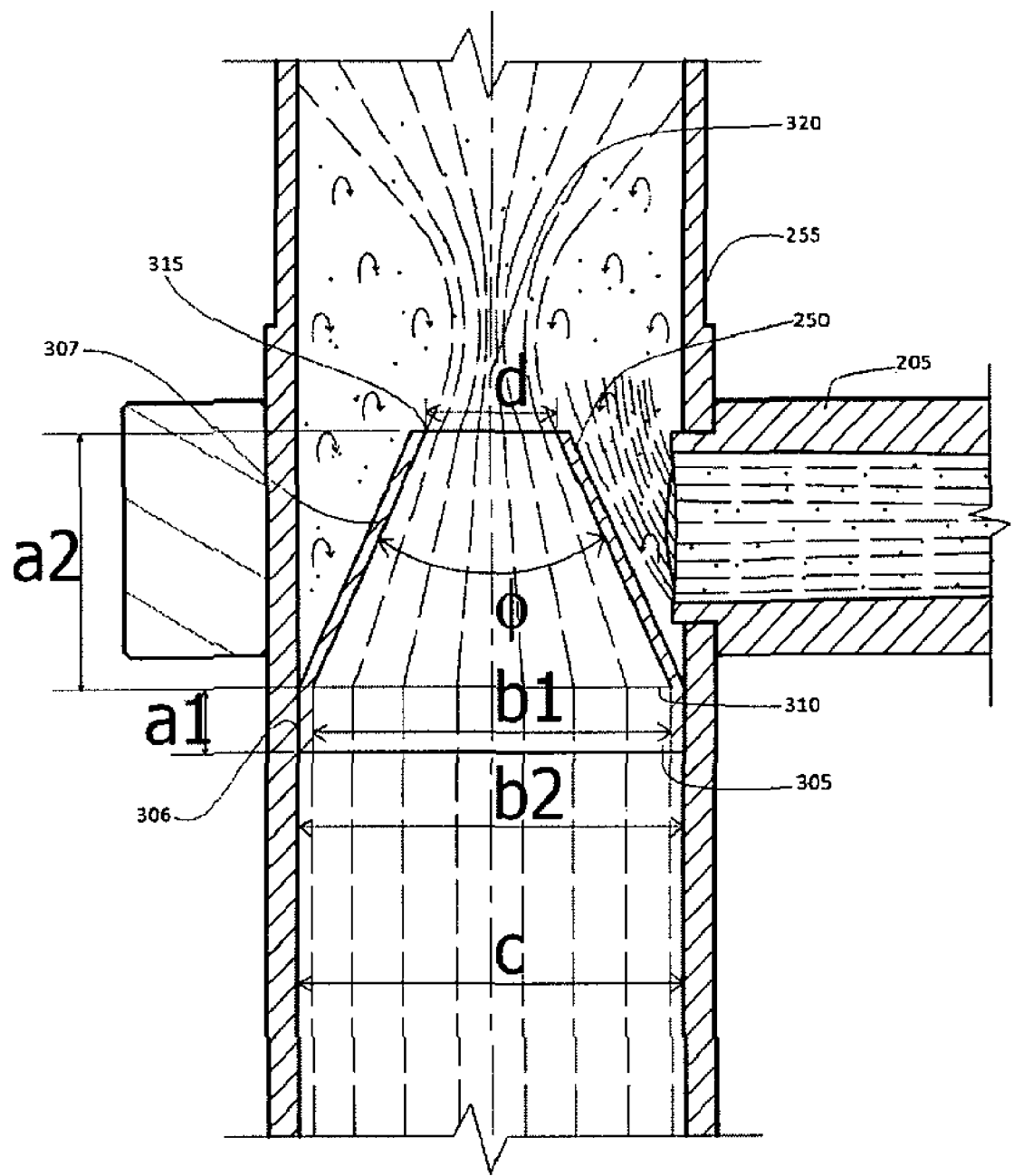
FIG. 7 shows a schematic of the working of the nozzle shown in FIG. 6

FIG. 7 shows the working of the nozzle 250 described in FIG. 6. Liquid flowing through the conduit 255 enters the borehole 305 and travels through the borehole 310 and finally through the borehole 315 where it converges. According to Bernoulli's principle, a low pressure regime 320 in the conduit 255 is created in the proximity to the borehole 315 of the nozzle 250. This low pressure regime 320 in the dirt collection conduit system 220 along with a higher pressure on the outer surface 145 of the filter screen 105 creates a pressure differential which makes the fluid rush through the central nozzle 225 inside the suction chamber 205, which subsequently results in removal of retentate through the plurality of peripheral suction nozzles 235.

Figure 8:
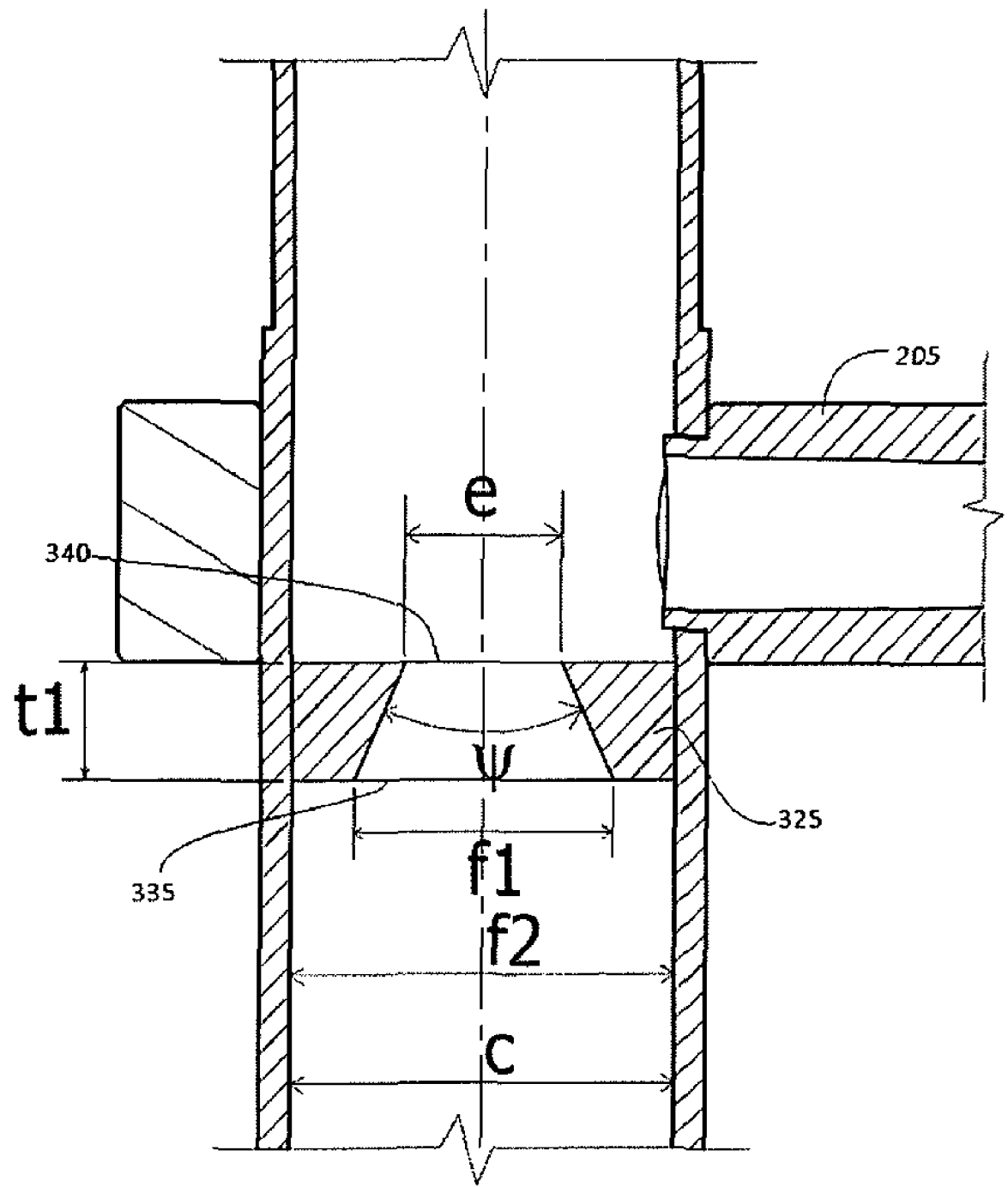
FIG. 8 shows a second arrangement of an orifice plate in the conduit of the dirt collection conduit system
Figure 9:
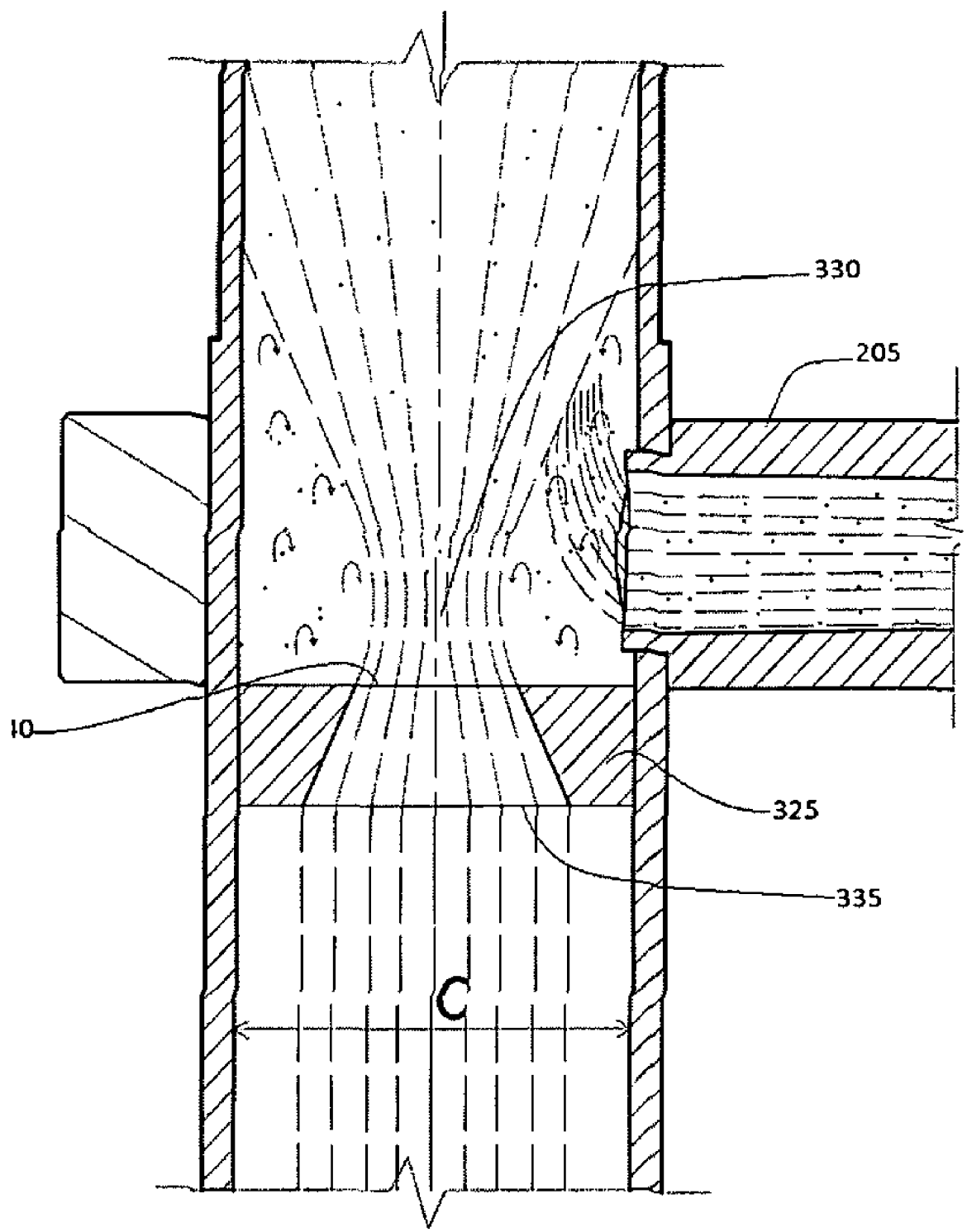
FIG. 9 shows a schematic of the working of the orifice plate shown in FIG. 8

FIG. 8 shows an orifice plate 325 in the conduit 255 of the dirt collection conduit system 220 which is a second arrangement for producing a low pressure regime in the conduit 255 of the dirt collection conduit system 220. FIG. 9 shows a schematic of the working of the orifice plate shown in FIG. 8. The orifice plate 325 has a thickness t1 is disposed or positioned inside the conduit 255 of the dirt collection conduit system 220, such that a low pressure regime 330 produced near a mouth of the orifice plate is adjacent the opening of the suction chamber 205 into the conduit 255. The orifice plate comprises a first borehole 335 and a second borehole 340, the first borehole 335 being larger than the second borehole 340. In other words, the bore of the orifice plate 325 converges from the first borehole 335 towards the second borehole 340. The fluid passing through the converging portion causes the low pressure regime 330 due to Bernoulli's principle. The first borehole 335 and the second borehole 340 are concentric and the converging angle between them is Ψ. Ψ can be any value between 1° and 10°. In FIG. 8, e is the diameter of the second borehole 340, f1 is the diameter of the first borehole 335, f2 is the outer diameter of the orifice plate 325 and c is the inner diameter of the conduit 255.

Tt is to be understood that the foregoing description is intended to be purely illustrative of the principles of the disclosed techniques, rather than exhaustive thereof, and that changes and variations will be apparent to those skilled in the art, and that the present invention is not intended to be limited other than as expressly set forth in the following claims.

We claim:

1. A cleaning apparatus for cleaning a filter screen, wherein the apparatus comprises:
   a filter screen to be cleaned;
   a suction chamber movably positioned adjacent to the filter screen;
   a first end of the suction chamber is positioned adjacent to an inner surface of the filter screen;
   a second end of the suction chamber is coupled to a dirt collection conduit system;
   a plurality of nozzles arranged inside conduit of the dirt collection conduit system, wherein each of the nozzles within the plurality of nozzles comprises a first portion with a constant diameter and a second portion with a convergence leading to a mouth of the nozzle;
   an outer surface of the filter screen is arranged such that the outer surface is at atmospheric pressure or at a higher pressure than the dirt collection conduit system;
   a central nozzle is arranged concentrically within the suction chamber and positioned at the first end, wherein a largest diameter of the central nozzle is lesser than an inner diameter of the suction chamber; and
   a plurality of peripheral suction nozzles arranged circularly in a circular clearance between the largest diameter of the central nozzle and the inner diameter of the suction chamber, wherein a low pressure enables fluid to be sucked in forcefully through the plurality of peripheral nozzles, so as to remove retentate from the inner surface of the filter screen.

2. The cleaning apparatus as recited in claim 1, wherein the suction chamber is arranged to rotate about an axis of the dirt collection conduit system, the dirt collection conduit system extends along an axis of a cylindrical housing, the cylindrical housing containing a cylindrical filter screen internally and wherein a rotation of the suction chamber is arranged to facilitate removing retentate from a circular portion of the cylindrical filter screen.

3. The cleaning apparatus as recited in claim 2, further comprises a purge outlet and a purging valve, arranged for connecting the dirt collection conduit system to a low-pressure environment.

4. The cleaning apparatus as recited in claim 3, further comprises a plurality of suction chambers rotatably coupled to the dirt collection conduit system with fluid communication between the plurality of suction chambers and the dirt collection conduit system, the plurality of suction chambers arranged at different positions along the dirt collection conduit system to facilitate removing retentate from different positions of the cylindrical filter screen.

5. The cleaning apparatus as recited in claim 4, wherein each of the plurality of nozzles is associated with each of the plurality of suction chambers, such that each of the plurality of nozzles is arranged to produce the low pressure regime to facilitate suction from each of the suction chamber when the pressure differential exists between the outer surface of the filter screen and the dirt collection conduit system.

6. The cleaning apparatus as recited in claim 5, wherein each of the nozzles within the plurality of nozzles comprises a first borehole with a larger diameter and a second borehole with a lesser diameter.

7. The cleaning apparatus as recited in claim 1, wherein the central nozzle comprises a first portion with a constant cross-sectional area and a second portion with a converging cross-sectional area, wherein the first portion is proximal to the first end of the suction chamber and the second portion is distal to the first end of the suction chamber.

8. The cleaning apparatus as recited in claim 7, further comprising a divergent nozzle extending from an opening of the second portion to the second end of the suction chamber to facilitate streamlining of the fluid ejected from the second portion of the central nozzle.

9. The cleaning apparatus as recited in claim 1, wherein the central nozzle comprises a converging portion.

10. The cleaning apparatus as recited in claim 4, wherein each of the plurality of suction chambers is shaped elliptical externally, such that a major axis of the suction chamber forms an angle $\theta$ with a horizontal plane, wherein the angle $\theta$ is the same as an angle of spiral movement of the nozzle to minimize drag.

* * * * *